United States Patent

Scata

[11] Patent Number: 4,993,535
[45] Date of Patent: Feb. 19, 1991

[54] BIDIRECTIONAL TRAVELLING DEVICE FOR THE SIDE-SORTING OF ARTICLES IN FLEXIBLE PATH TRANSPORTING SYSTEMS

[75] Inventor: Mario Scata, Teramo, Italy

[73] Assignee: Meccanizzazione Postale E Automazione SpA, Piane di Sant'Atto, Italy

[21] Appl. No.: 448,273

[22] Filed: Dec. 11, 1989

[30] Foreign Application Priority Data

Dec. 22, 1988 [IT] Italy ............... 22322 B/88

[51] Int. Cl.⁵ .................................... B65G 47/46
[52] U.S. Cl. ............................ 198/365; 209/698
[58] Field of Search ............... 198/365; 209/698, 707, 209/941

[56] References Cited

U.S. PATENT DOCUMENTS

| | | | |
|---|---|---|---|
| 3,386,563 | 6/1968 | Harrison | 198/365 |
| 4,031,998 | 6/1977 | Suzuki et al. | 198/365 |
| 4,089,404 | 5/1978 | Venzke | 198/802 |

FOREIGN PATENT DOCUMENTS 3000641 7/1980 Fed. Rep. of Germany ...... 198/365

0138273 10/1979 Japan .................................... 198/365

*Primary Examiner*—Donald T. Hajec
*Attorney, Agent, or Firm*—Spencer & Frank

[57] ABSTRACT

A bidirectional travelling device for side sorting of articles in a flexible path transporting system made of at least one support fastened to a guide tow element of the system. Each support is made of a channel iron which is positioned to transversely with respect to the flexible path. The travelling device also includes a swiveling member positioned on each support for loading the article to be sorted. The swiveling member is made of two complementary, fork-shaped elements facing and interpenetrating one another. The fork-shaped elements pivot on sideboards of the channel iron. Due to gravity, the elements are in a horizontal, stable equilibrium position to define a plane for supporting the article. The travelling device further includes a scheme for actuating and resetting the swiveling member for rotating and raising the respective fork-shaped elements causing the downward discharge of the article transverse to the flexible path transporting system. The fork-shaped element thereafter returns to the equilibrium position due to the influence of gravity, causing the switching member to be reset.

4 Claims, 2 Drawing Sheets

BIDIRECTIONAL TRAVELLING DEVICE FOR THE SIDE-SORTING OF ARTICLES IN FLEXIBLE PATH TRANSPORTING SYSTEMS

BACKGROUND OF THE INVENTION

1. Field of the Invention

The invention relates to a bidirectional travelling device for side-sorting of articles in flexible path transporting systems.

2. Discussion of the Background

Such a device is of the type comprising a swivelling member, on which the article to be sorted is loaded, arranged on a support fastened to the guided tow element (belt or chain) of the system and which is tilted transversely in both directions by actuating means and then reset after the article has been discharged.

Bidirectional sorting devices of this type are already known in which the swivelling member consists of a flat connected to the support through a spring and toggle lever device or, like in the "gull-wing" type, the swivelling member consists of two independent flat elements, operated by springs which, in the loading position, assume a V-configuration whereas, during the discharge, one of the two flat elements is turned down and the article discharged laterally.

These known devices have some drawbacks.

First, they require a reset at the end cycle.

Second, the presence of springs and snap devices makes the sorting devices dangerous for the operator. Thus, the plant must be provided with protection shields which increase the costs.

Moreover, these known devices are heavy and noisy.

SUMMARY OF THE INVENTION

Therefore, the object of the present invention is to design a device of the above-mentioned type to be simple in construction, inexpensive to manufacture and free from above mentioned drawbacks.

This object is achieved by a bidirectional travelling device for the side sorting of articles in flexible path transporting systems having a bidirectional travelling device for side sorting of articles in a flexible path transporting system made of at least one support fastened to a guide tow element of the system. Each support is made of a channel iron which is positioned to transversely with respect to the flexible path. The travelling device also includes a swiveling member positioned on each support for loading the article to be sorted. The swiveling member is made of two complementary, fork-shaped elements facing and interpenetrating one another. The fork-shaped elements pivot on sideboards of the channel iron. Due to gravity, the elements are in a horizontal, stable equilibrium position to define a plane for supporting the article. The travelling device further includes a scheme for actuating and resetting the swiveling member for rotating and raising the respective fork-shaped elements causing the downward discharge of the article transverse to the flexible path transporting system. The fork-shaped element thereafter returns to the equilibrium position due to the influence of gravity, causing the swiveling member to be reset.

BRIEF DESCRIPTION OF THE DRAWINGS

The invention will be clearly understood from the following description, given as an indicative but not limitative example, in conjunction with the attached drawing in which.

DETAILED DESCRIPTION OF THE PREFERRED EMBODIMENTS

Figure 1:
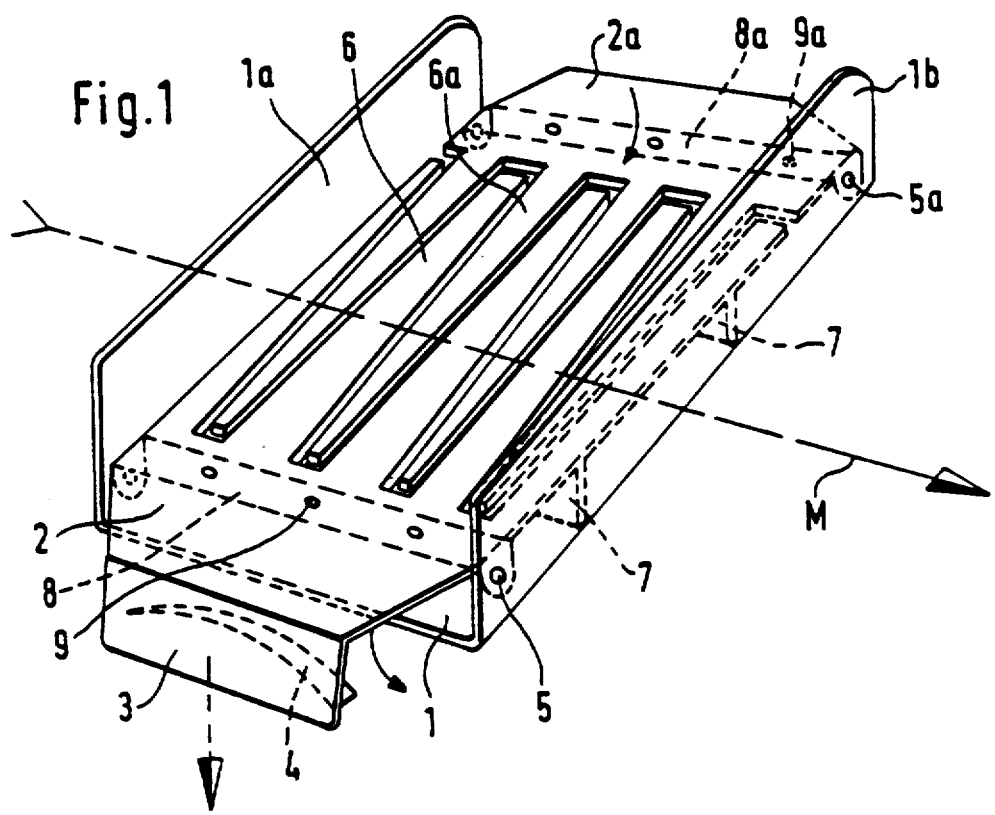
FIG. 1 shows schematically, in a perspective view, the sorting device according to the invention.

Referring now more particularly to the figures, the device consists of a U-shaped support, e.g. a channel iron, 1 in which the two branches 1a,1b are side boards provided for separating the articles and supporting two fork-shaped elements 2,2a pivoted thereto by means of the pivots 5. The pivots 5 carry a C-shaped support 8,8a fastened to the elements 2,2a by means of rivets or screws 9,9a.

The fork-shaped elements 2,2a are each provided with a longer end whose fingers 6,6a interpenetrate and abut on ribs 7 formed on the bottom of support 1 so as to define, in the rest position, an horizontal bearing plane for the article 14 to be sorted.

The position of pivot 5,5a and the sizing of fork-shaped elements 2,2a are such that, due to gravity, the rest position is a stable equilibrium condition for the fork-shaped elements.

The opposite ends 3,3a of the fork-shaped elements are bent downwards and provided with cam elements 4,4a suitably shaped and designed to be actuated during the motion, by respective actuators 10,10a provided at the discharge points.

The sorting device is mounted on a guided tow element 12, slidable in a guide II of the system.

The operation of the above mainly structural description of the sorting device according to the invention follows.

The device is so mounted on the tow element 12 that the side boards 1a, 1b are arranged transversely with respect to the motion direction indicated by the arrow M.

Figure 2:
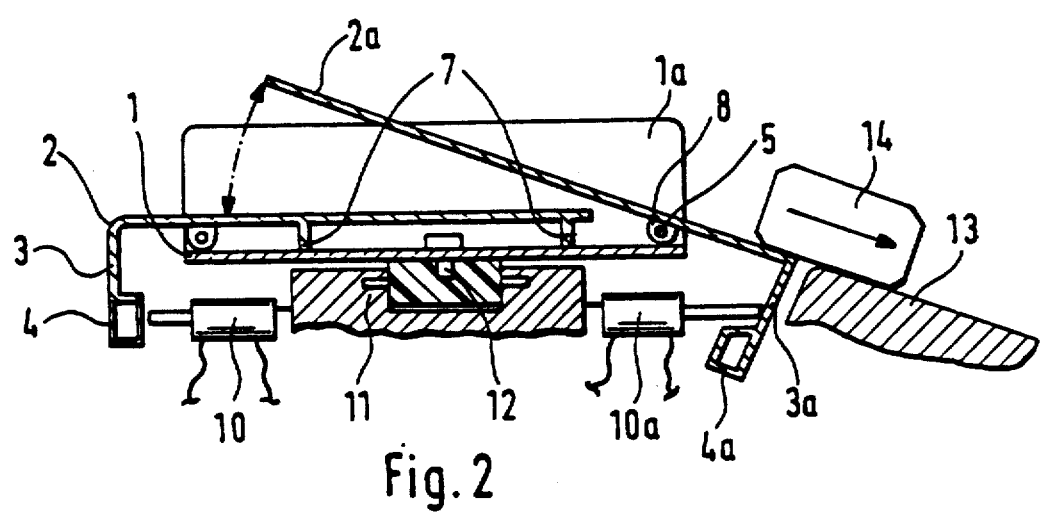
FIG. 2 illustrates, in a cross-section view, the device of FIG. 1 while side discharging the carried article.
Figure 3:
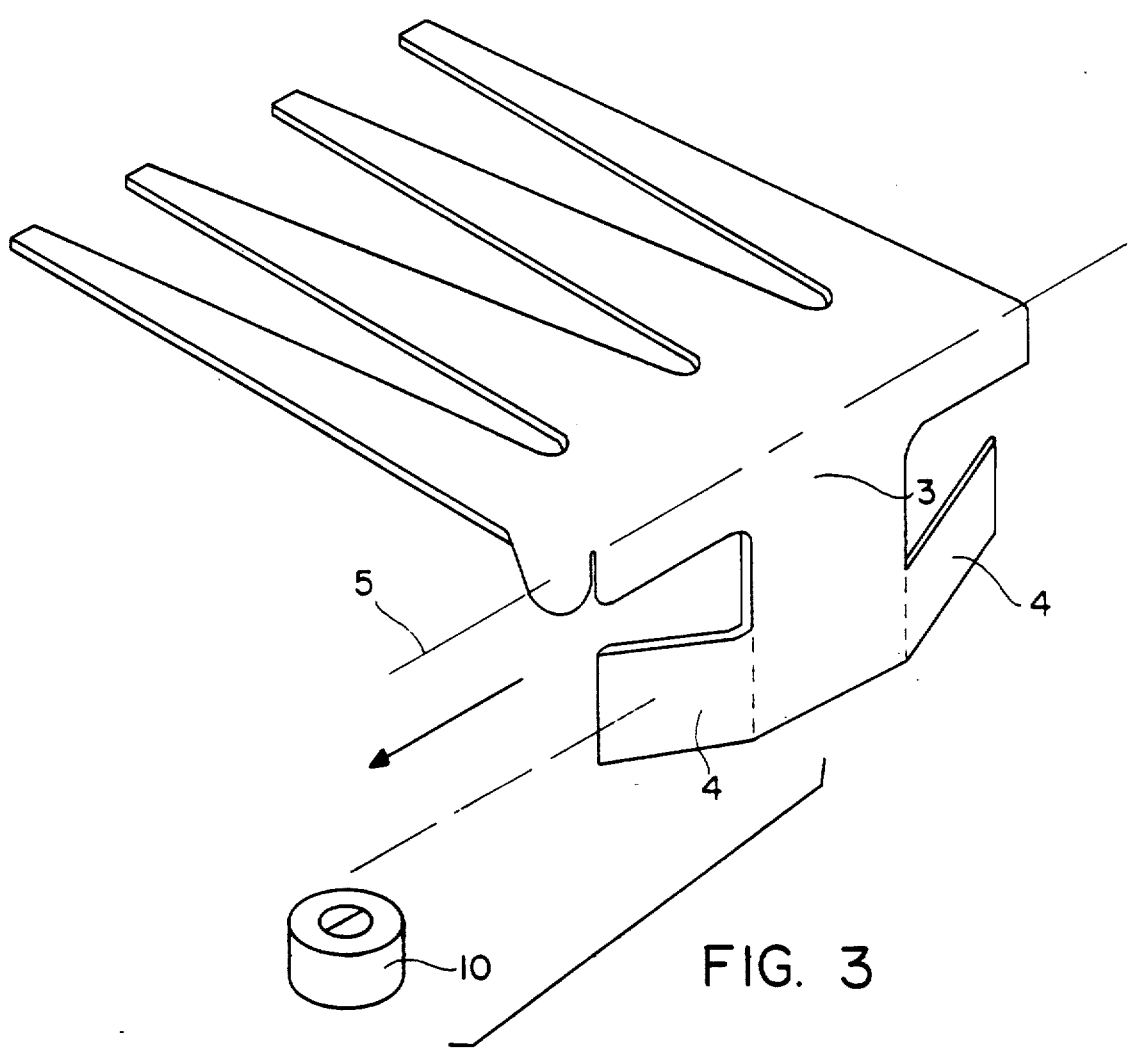
FIG. 3 is a perspective view of a fork-shaped element.

When the sorting device reaches the dischage point, the respective actuator (10a in case of FIG. 2) is energized in a conventional way and engages the corresponding cam-shaped element (4a) thus causing a rotation of the corresponding fork-shaped element (2a), whereby the object (14) is ejected into the corresponding container (not shown), through a chute (13) if necessary.

As soon as the cam 4,4a overcomes the actuator 10,10a, the fork element is restored to the rest position by gravity.

The invention fully achieves the above objects. Indeed, thanks to this solution, there is provided a bidirectional travelling device for the side-sorting of articles in a flexible path transporting systems, which is very simple to be worked in mass production and at very low costs. It may be, for instance, simply formed from a metal sheet by shearing and bending.

Furthermore, the device according to the invention is very easy to assemble, disassemble and replace, as well as light and modular.

The gravity reset allows the elimination of springs, toggles and other snap mechanisms which make devices, of the type mentioned at the outset, noisy and very dangerous for the operator, particularly at high sorting rates.

Additionally the device according to the invention is reliable, from the point of view of article separation, owing to the presence of side boards.

Finally, using sorting devices of equal or different length, on a flexible path transporting system, a synchronous sorting system is obtained, as the carried articles are so positioned that their presence is assured at any time.

It is understood the above embodiment has been described by way of example and not as a limitation to the scope of the invention, whereby it is possible to realize modifications in manufacturing details without constituting a limitation of the technical solution, as above described.

Particularly, the cam element may be formed by suitably shaping the end 3 of the fork-shaped elements.

Further, the materials and sizes may vary according to manufacturing requirements and contingencies, always observing the illustrated, described and below claimed features.

I claim:

1. A bidirectional travelling device for the side-sorting of articles in a flexible path transporting system, comprising:

at least one support fastened to a guided tow element of the system, each support being made of a channel iron having two side boards, the channel iron being disposed transversely with respect to the flexible path;

a swiveling member disposed on each support, on which the article to be sorted is loaded, the swiveling member comprising two complementary, fork-shaped elements facing and interpenetrating one another and pivoting on the side boards, whereby the elements are in a horizontal, stable equilibrium position due to gravity to define a plane supporting the article; and means for actuating and resetting the swiveling member, for rotating and raising the respective fork-shaped elements, causing downward discharge of the article transverse to the flexible path transporting system, the fork-shaped element thereafter returning to the equilibrium position due to gravity, whereby the swiveling member is reset.

2. The bidirectional traveling device of claim 1, wherein each of the fork-shaped elements have bent ends which oppose one another and the means for actuating and resetting the swiveling member comprising two actuators provided at discharge points located on the flexible path transporting system and two cam elements, respectively fastened at the bent ends of the fork-shaped elements, the actuators, when activated, engage the respective cams and thereby rotate the fork-shaped elements and side-sort the article.

3. The bidirectional traveling device of claim 2, wherein the actuators are electrically activatable.

4. The bidirectional traveling device of claim 2 wherein said cam elements are integral to the opposite ends of said fork-shaped elements.

* * * * *